United States Patent [19]

Kervagoret et al.

[11] Patent Number: 5,358,316

[45] Date of Patent: Oct. 25, 1994

[54] PRESSURE-REGULATING DEVICE FOR A HYDRAULIC CIRCUIT

[75] Inventors: Gilbert Kervagoret, Montreuil; Jean M. Cheron, Longperrier, both of France

[73] Assignee: Bendix Europe Services Techniques, Drancy, France

[21] Appl. No.: 219,010

[22] Filed: Mar. 28, 1994

Related U.S. Application Data

[63] Continuation of Ser. No. 909,267, Jul. 6, 1992, abandoned.

[30] Foreign Application Priority Data

Jul. 30, 1991 [FR] France ................. 91 09667

[51] Int. Cl.$^5$ ......................................... B60T 13/18
[52] U.S. Cl. ............................... 303/116.1; 303/10
[58] Field of Search ............. 251/129.08; 303/9.62, 303/9.74, 10, 11, 13, 113.1, 113.2, 114.3, 115.4, 116.1, 117.1, 119.1, 119.2, 116.2

[56] References Cited

U.S. PATENT DOCUMENTS

| | | | |
|---|---|---|---|
| 4,940,295 | 7/1990 | Adachi et al. | 303/117.1 |
| 4,944,565 | 7/1990 | Gilbert | 303/116.1 X |
| 5,018,797 | 5/1991 | Takata | 303/117.1 |
| 5,042,886 | 8/1991 | Sato | 303/119.1 |
| 5,106,167 | 4/1992 | Matsuda | 303/117.1 X |
| 5,152,586 | 10/1992 | Burgdorf | 303/116.1 X |
| 5,174,636 | 12/1992 | Burgdorf et al. | 303/116.1 |
| 5,174,637 | 12/1992 | Kervagoret | 303/116.1 X |
| 5,186,093 | 2/1993 | Kervagoret | 91/433 |
| 5,186,525 | 2/1993 | Sato et al. | 303/119.1 X |
| 5,191,827 | 3/1993 | Kervagoret | 91/433 |
| 5,234,030 | 8/1993 | Kervagoret et al. | 137/596.17 |

FOREIGN PATENT DOCUMENTS

| | | | |
|---|---|---|---|
| 0369412 | 5/1990 | European Pat. Off. | |
| 452173 | 10/1991 | European Pat. Off. | 303/119.2 |
| 452174 | 10/1991 | European Pat. Off. | 303/119.2 |
| 4009640 | 6/1991 | Fed. Rep. of Germany . | |
| 4001421 | 7/1991 | Fed. Rep. of Germany | 303/113.2 |
| 4112821 | 10/1992 | Fed. Rep. of Germany | 303/113.2 |
| 2-38175 | 2/1990 | Japan | 303/119.1 |
| 3-276853 | 12/1991 | Japan . | |
| 2119883 | 11/1983 | United Kingdom . | |
| 2194010 | 2/1988 | United Kingdom . | |

*Primary Examiner*—Robert J. Oberleitner
*Assistant Examiner*—Alfred Muratori
*Attorney, Agent, or Firm*—Larry J. Palguta

[57] ABSTRACT

The invention relates to a pressure-regulating device for a hydraulic circuit, especially for a brake circuit of a motor vehicle, comprising at least one source of fluid under pressure (10) connected to a reservoir of fluid under low pressure (16) and, in at least one subcircuit (I, II), a second source of fluid under pressure (50) and two pressure receivers (20, 22). According to the invention, a proportional solenoid valve (24, 26) is associated with each pressure receiver (20, 22) and is connected to the source of fluid under pressure (10) and to the second source of fluid under pressure (50), and a differential pressure/vacuum valve (100) closes, at rest, communication between the source of fluid under pressure (10) and the supply of the second source of fluid under pressure (50), this communication being opened when the second source of fluid under pressure is put into operation.

7 Claims, 1 Drawing Sheet

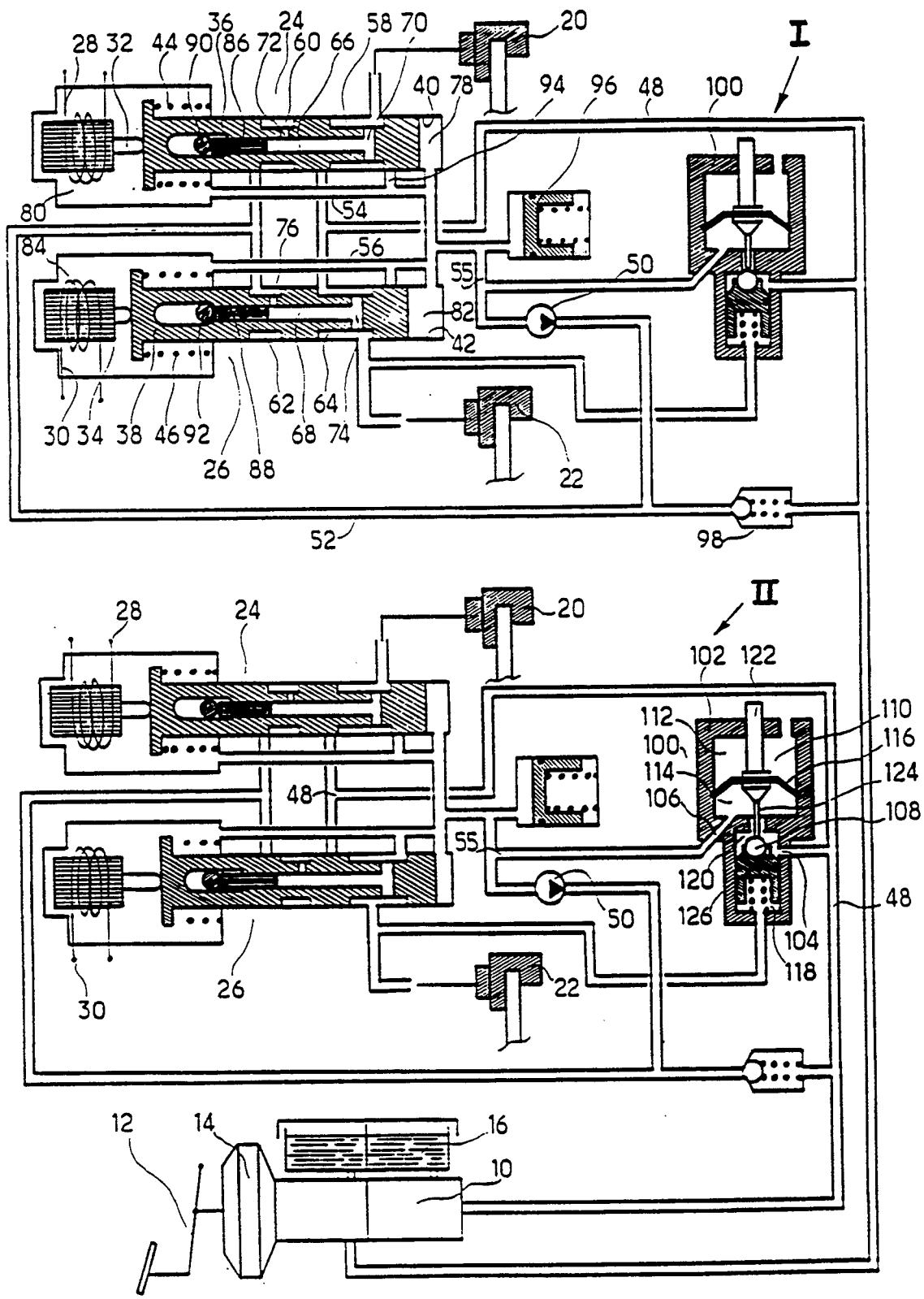

PRESSURE-REGULATING DEVICE FOR A HYDRAULIC CIRCUIT

This is a continuation of application Ser. No. 07/909,267 filed Jul. 6, 1992 now abandoned.

The present invention relates to a pressure-regulating device for a hydraulic circuit.

BACKGROUND OF THE INVENTION

It is designed especially for the brake circuits of motor vehicles equipped with a wheel anti-lock system. Known anti-lock systems make use, between a source of fluid under pressure, such as an electric pump or a so-called "full-power" master cylinder, and a pressure receiver, such as a brake motor, of a solenoid valve controlled by a computer as a function of different signals representing particularly the rotational speed of the wheels of the vehicle, in order to relieve the fluid pressure in the brake motor when the computer detects the imminent locking of a wheel and then to increase this pressure again when the computer detects too high a rotational speed of the wheel, until the wheel once again shows a tendency to lock, the intake/relief cycles then being repeated.

The current trend is to take advantage of this wheel anti-lock equipment to make it operate also as a system for preventing the slip of the driving wheels of the vehicle. The computer then commands an increase of pressure in a brake motor of a driving wheel, when it detects a rotational speed of this wheel which is too high in relation to that of a non-driving wheel, and a relief of the pressure in this brake motor, when the speed of the driving wheel is in the neighborhood of that of a non-driving wheel.

Such systems employ two-position solenoid valves, that is to say functioning in the all-or-nothing mode, which give rise to numerous disadvantages for the anti-lock/anti-slip system. In fact, during the intake/relief cycles, the solenoid valve changes from one of its positions to the other many times, and this gives rise to considerable noise generated by the movable assembly of the solenoid valve. On the other hand, pressure peaks occur in the brake motors, thus bringing about transient states which cannot be controlled by the computer. Moreover, these systems are generally highly complex and require numerous solenoid valves, thereby aggravating the disadvantages mentioned above.

The object of the present invention is, therefore, to remedy these disadvantages by providing a pressure-regulating device for a hydraulic circuit, for example for motor-vehicle brake circuits, which allows a wheel anti-lock and anti-slip operating mode and is simple and reliable and the number of solenoid valves of which is reduced to a minimum, in order, furthermore, to reduce the cost of such systems.

To achieve this, the invention provides for the use of a so-called proportional solenoid valve ensuring in the user circuit a hydraulic pressure which is a function of the current circulating in the coil of the solenoid valve within a specific range of movement of the core of the solenoid valve.

Such a solenoid valve then has the advantage that it can be controlled simply by varying the electrical current circulating in the coil, without the need for beating of the movable part; this therefore results in a marked decrease of the pressure peaks in the brake motors. Moreover, such a solenoid valve can easily be controlled by computer ensuring a variable-frequency cut-off of a direct current, such as is found on a motor vehicle, or a fixed-frequency cut-off with a variable cyclic ratio, the intensity of the current integrated by the coil then being a function of the cyclic ratio.

Such a solenoid valve is described for example in U.S. patent application No. 4,744,389. However, the solenoid valve described in this document cannot be arranged in a hydraulic wheel anti-lock brake circuit because of the pressures employed, particularly during the energization of the solenoid valve. Indeed, the solenoid valve of this document is designed for operating permanently in a system for regulating a relatively low pressure. This physical limitation therefore prevents the use of such a solenoid valve with high pressures in the hydraulic motor. Moreover, this solenoid valve does not make it possible to increase the pressure linearly when the current decreases linearly in the coil, and vice versa.

Known anti-slip systems, although using many components of the anti-lock systems, such as the wheel-speed sensors, computer, source of fluid under pressure, etc., nevertheless require additional components, such as other solenoid valves, a specific source of fluid under pressure, etc.

The present invention therefore provides for using for the anti-slip operating mode the proportional solenoid valves which are used for the anti-lock operating mode by means of a differential pressure/vacuum valve.

This thus reduces the number of solenoid valves to a minimum, namely one per wheel, for a combined anti-lock/anti-slip system.

SUMMARY OF THE INVENTION

The present invention therefore provides a pressure-regulating device for a hydraulic circuit, especially for a brake circuit of a motor vehicle, comprising at least one source of fluid under pressure connected to a reservoir of fluid under low pressure and, in at least one subcircuit, a second source of fluid under pressure and two pressure receivers, characterized in that a proportional solenoid valve is associated with each pressure receiver and is connected to the source of fluid under pressure and to the second source of fluid under pressure, and in that a differential pressure/vacuum valve closes, at rest, communication between the source of fluid under pressure and the supply of the second source of fluid under pressure, this communication being opened when the second source of fluid under pressure is put into operation.

BRIEF DESCRIPTION OF THE DRAWING

The invention will now be described by way of example with reference to the accompanying drawing in which:

the single FIGURE shows diagrammatically a brake circuit produced according to the invention.

DESCRIPTION OF THE PREFERRED EMBODIMENT

The FIGURE illustrates a brake circuit which comprises in the conventional way a master cylinder 10 actuated by a brake pedal 12, for example by way of a vacuum brake booster 14. The master cylinder 10 is supplied by a fluid reservoir 16 and is of the tandem type, that is to say it is capable, when actuated, of generating an increase of pressure of the fluid in a so-called primary circuit I and in a so-called secondary circuit II identical to the first; the reference numerals used for the components of each circuit will therefore be identical in the following description, the primary circuit I illustrating the anti-lock operating mode and the secondary circuit II illustrating the anti-slip operating mode.

Each circuit is connected, at rest, to brake motors, for example 20 for a driving wheel and 22 for a non-driving wheel, which will hereafter be called a free wheel, by means of proportional solenoid valves 24 and 26.

It is known that the coil of so-called proportional solenoid valves has the essential characteristic of being capable of supplying a substantially constant force for a specific current within a considerable range of movement of the magnetic core of the order of 2 to 3 mm. This characteristic is generally obtained by means of a particular geometry of the pole pieces. This characteristic is put to use in the present invention in order to perform the requisite function by modulation of the current circulating in the coil, so as to prevent operation involving a movable part beating very rapidly.

The FIGURE shows such solenoid valves 24 and 26, each comprising an energizing coil 28, 30 and a sliding magnetic core equipped with its pusher 32, 34 bearing on a slide 36, 38 sliding in a bore 40, 42.

A control spring 44, 46 stresses the slide 36, 38 towards the pusher 32, 34 of each solenoid valve 24, 26. The slide 36, 38 is machined so as to be capable of selectively putting the brake motor 20, 22 in communication with the master cylinder 10 via a conduit 48, with a hydrodynamic source of fluid under pressure, such as an electric pump 50, if appropriate associated with a pressure accumulator (not shown), via a conduit 52 or with a low-pressure capacity 96 via a conduit 54, 56.

For this purpose, the slide 36, 38 is formed with two annular peripheral grooves 58, 60; 62, 64 and with a blind central bore forming a reaction chamber 66, 68 communicating with the annular grooves by means of radial ducts 70, 72; 74, 76, the duct 72, 76 functioning as a restriction. The chambers 78, 80; 82, 84 located on either side of the slide 36, 38 in the bore 40, 42 are at the same pressure and communicate with one another by way of the conduits 54, 56 and with the suction side of the electric pump 50 via a conduit 55. The central bore 66, 68 is closed virtually sealingly by a reaction needle 86, 88 bearing on the body, in which the bore 40, 42 is formed, by means of a stop 90, 92 and forms a reaction chamber determining a reaction force added to the force generated by the coil 28, 30.

In the rest position, as shown for the solenoid valve 26, the source of fluid under pressure 10 is in communication with the brake motor 22 by way of the annular groove 64 and conduit 48 and with the reaction chamber 68.

When the computer detects the imminent locking of a wheel, for example that associated with the brake motor 20, it commands the energization of the solenoid valve 24 associated with this wheel and simultaneously the activation of the electric pump 50. First of all, the current circulating in the coil generates a force opposing only that of the spring 44, whatever the pressure prevailing in the hydraulic circuit, since the chambers 78 and 80 communicate with one another. The pressure prevailing in the reaction chamber 68 assists the solenoid valve. This advantageously makes it possible for the solenoid valve to avoid having a high electrical consumption. The displacement of the slide 36 counter to the control spring 44 interrupts the supply of fluid under pressure from the source 10 to the brake motor 20 by shutting off the conduit 48 before the current in the coil 28 reaches its nominal intensity. Then, when the intensity is nominal, the slide 36, in its movement counter to the spring 44, closes the conduit 52, thereby isolating the brake motor 20 from the source of fluid under high pressure formed by the electric pump 50. The slide 36 likewise closes a conduit 94 for connection with the conduit 54 which, as seen above, is connected to the suction side of the electric pump 50 and to a low-pressure capacity 96.

When the computer commands the increase of current in the coil 28, this results in a movement of the slide 36 such that the conduit 94 is partially opened, the effect of this being to connect the brake motor 20 to the conduit 54, to the capacity 96 and to the suction side of the electric pump 50.

A relief of the pressure of the fluid in the brake motor 20 therefore occurs. It will have been understood that the movement of the slide 36 counter to the spring 44 is generated by the current in the coil 28 and is assisted by the hydraulic reaction in the chamber 66 which generates a force added to that caused by the coil and opposing that generated by the booster spring 44. By a reduction of the intensity of the current in the coil 28, the pressure having fallen in the brake motor 20, the hydraulic reaction force attributable to the chamber 66 decreases and the slide is displaced in the other direction, reclosing communication between the brake motor 20 and the capacity 96 and subsequently restoring communication between the source 50 and the brake motor 20 by way of the restriction 72, allowing a less rapid increase of the pressure in the brake motor 20. If the intensity of the current in the coil is increased, the pressure will once again fall in the brake motor 20, since communication between it and the suction side of the electric pump 50 by way of the groove 58 will be reopened.

It can thus be seen that an increase of current in the coil 28 results in a decrease of the pressure of the fluid in the brake motor 20. It will then be seen that by modulating the current circuiting in the coil 28, for example by cut-off, the slide 36 will assume a position which is a function of the pressure prevailing in the chamber 66, and it will be possible to apply the desired fluid pressure to the brake motor 20 by carefully controlling this current. In fact, the hydraulic reaction generated in the chamber 66 will automatically open or close the communications between the brake motor 20 and source of fluid under pressure 50 and between the brake motor 20 and low-pressure capacity 96 for each specific value of the intensity of the current circulating in the coil 28.

A pressure-regulating device for a brake circuit, requiring only a single solenoid valve per wheel to ensure an anti-lock operating mode, this solenoid valve being of the proportional type and consuming only a very small amount of electrical energy by virtue of its reaction chamber, is therefore obtained. A non-return valve 98 can advantageously be arranged between the conduits 52 and 48, thus preventing the fluid of the hydraulic circuit from flowing back towards the electric pump 50 outside the anti-lock periods. Such a non-return valve will then be calibrated at a particular value, so that, when the electric pump 50 is in operation, the pressure generated by the latter is limited to a particular value.

The device just described is also capable of ensuring pressure regulation in the brake circuit for carrying out an anti-slip operating mode. Such a type of operation is illustrated in the secondary circuit II of the FIGURE.

It can be seen that each circuit comprises a differential pressure/vacuum valve 100. This valve comprises, in a body 102, a port 104 connected to the conduit 48 leading to a working chamber of the master cylinder 10. A port 106 is connected to the conduit 55 leading to the suction inlet of the electric pump 50. A shutter, for example consisting of a ball 108 loaded by a low-calibration spring, prevents any communication at rest between these two ports 104 and 106. A vessel 110 is separated into two chambers 112 and 114 sealingly by means of a flexible diaphragm 116. The chamber 112 is connected to the atmosphere, and the chamber 114 is connected via the port 106 to the conduit 55 leading to the suction inlet of the electric pump 50.

A piston 126 slides sealingly in a bore of the body 102, pushing the ball 108 and delimiting in this bore a chamber 118 subjected to the pressure prevailing in the brake motor 22 of the non-driving wheel and a chamber 120 connected by means of the port 104 to the conduit 48 leading to the master cylinder 10. A piston 122 slides in the body 102, is fixed to the diaphragm 116 and carries a needle 124 opposite the ball 108.

When it is at rest, as shown in the primary circuit, the differential valve 100, more particularly the ball 108, prevents communication between the master cylinder 10 and the suction side of the electric pump 50. Thus, normal braking, that is to say when the electric pump 50 and the solenoid valves 24 and 26 are still at rest, takes place, as described with reference to the primary circuit.

Operation in the anti-lock phase is identical to that described above, and the pressure in the brake motor 22 is likewise present in the chamber 118 of the valve 100 and consequently confirms the closing of communication between the chambers 114 and 120 of the valve 100, this closing already being ensured by the pressure of the fluid coming from the master cylinder 10 and being applied to the ball 108.

When the computer detects a tendency to slip, that is to say a rotational speed of the driving wheel 20 higher than that of the free wheel 22 by a predetermined amount, it then commands simultaneously the activation of the electric pump 50 and the maximum energization of the solenoid valve 26 associated with the brake motor 22 of the free wheel. The brake motor 22 is thereby isolated from the master cylinder 10 and connected to the low-pressure capacity 96, the conduit 48 being shut off. Since the electric pump 50 is in operation, its suction side is therefore under a vacuum, and this vacuum is transmitted by the conduit 55 to the port 106 and to the chamber 114 of the differential valve 100. The needle 124 of the piston 122 connected to the diaphragm 116 consequently pushes the ball 108 without any force, thus putting the suction side of the electric pump 50 and the conduit 55 in communication via the chamber 120 with the conduit 48, master cylinder 10 and low-pressure reservoir 16, thereby ensuring the supply of the electric pump 50 by means of the reservoir 16.

The computer also simultaneously commanded the energization of the solenoid valve 24 associated with the brake motor 20 of the driving wheel, to ensure that the latter is put under pressure in a way similar to that described for the anti-lock phase and not repeated in detail. When the rotational speed of the driving wheel is judged excessive in relation to that of the free wheels, the computer reduces the current in the coil 28. The slide 36 then retracts and allows the brake motor 20 to communicate with the outlet of the electric pump 50, thus generating a braking action on the driving wheel. When the rotational speed of the latter is equal to or slightly below that of the free wheels, the computer then commands an increase of current in the coil 28, thereby advancing the slide 36 and putting the brake motor 20 in communication with the suction side of the electric pump 50 and with the reservoir 16 by way of the differential valve 100. The pressure in the brake motor 20 can therefore fall very quickly, thus leaving the wheel associated with the brake motor 20 subjected to the action of the torque exerted by the engine of the vehicle. These intake/relief phases continue until the tendency of the driving wheel to slip has disappeared.

A pressure-regulating system making it possible to ensure an anti-lock and an anti-slip operating mode, whilst using only a single solenoid valve per wheel and a differential valve per non-driving wheel, has therefore been described. Such a system is thus especially simple and therefore reliable and inexpensive.

We claim:

1. A pressure regulating device in an anti-lock and anti-slip hydraulic braking circuit of a motor vehicle, comprising at least one first source of fluid under pressure connected to a reservoir of fluid under low pressure and, in at least one subcircuit, a second source of fluid under pressure and two pressure receivers, characterized in that a single proportional solenoid valve is associated with each respective pressure receiver to effect anti-lock and anti-slip functions and is connected to the first source of fluid under pressure and to the second source of fluid under pressure, and in that a differential pressure/vacuum valve closes, at rest, a communication between the first source of fluid under pressure and a supply connection to the second source of fluid under pressure, the communication being opened when the second source of fluid under pressure begins operating and a suction side thereof causes less than atmospheric pressure to be communicated via the supply connection to the differential pressure/vacuum valve which operates responsively to open the communication and permit fluid flow from the first source of fluid under pressure to the second source of fluid under pressure.

2. The pressure regulating device in an anti-lock and anti-slip hydraulic braking circuit of a motor vehicle in accordance with claim 1, wherein said fluid flow from the first source of fluid under pressure comes undirectly from a reservoir associated therewith.

3. The pressure regulating device in an anti-lock and anti-slip hydraulic braking circuit of a motor vehicle in accordance with claim 2, wherein the differential pressure/vacuum valve includes a first chamber communicating with atmospheric pressure and a second chamber communicating, via a valve member, with hydraulic fluid of said communication.

4. The pressure regulating device in an anti-lock and anti-slip hydraulic braking circuit of a motor vehicle in accordance with claim 3, wherein the valve member comprises a ball valve connected with a sliding piston biased by a spring.

5. The pressure regulating device in an anti-lock and anti-slip hydraulic braking circuit of a motor venicie in accordance with claim 3, wherein the differential pressure/vacuum valve is connected with a pressure receiver of a non-driven wheel of the motor vehicle.

6. The pressure regulating device in an anti-lock and anti-slip hydraulic braking circuit of a motor vehicle in accordance with claim 5, wherein the pressure receiver of the non-driven wheel includes a fluid connection with the differential pressure/vacuum valve.

7. The pressure regulating device in an anti-lock and anti-slip hydraulic braking circuit of a motor vehicle in accordance with claim 6, wherein the valve member comprises a ball valve connected with a sliding piston biased by a spring, a spring side of said piston including a chamber which communicates with said fluid connection from the non-driven wheel.

* * * * *